UNITED STATES PATENT OFFICE.

RICHARD M. SOMMERS, OF PHILADELPHIA, PENNSYLVANIA.

FILTERING COMPOSITION.

SPECIFICATION forming part of Letters Patent No. 301,015, dated June 24, 1884.

Application filed August 27, 1883. (No specimens.)

*To all whom it may concern:*

Be it known that I, RICHARD M. SOMMERS, of the city and county of Philadelphia, in the State of Pennsylvania, have invented a certain new and useful Filtering Composition; and I do hereby declare the following to be a full, clear, and exact description of the same.

Take gravel, one part or amount; white bar-sand, two parts or volumes; phosphate of lime, two parts or volumes; animal charcoal, two parts or volumes. These ingredients may be indiscriminately mixed, or they may be arranged in layers—one over the other—in the order above specified. The proportions specified may be varied at will; but those set forth I consider the best for the purposes of my invention.

I am aware that gravel, sand, and charcoal have been used for filtering purposes; hence I do not claim the same nor their combination. I am not aware, however, that phosphate of lime and animal charcoal have heretofore been used together. The phosphate of lime clears the water of oily, insoluble, and coloring matter, and hence prevents the charcoal from becoming clogged up by such matter, leaving it more free than it would otherwise be to perform its usual functions. Besides, as phosphate of lime is the base of animal charcoal and the medium through or by the aid of which the latter has the property of relieving water of organic matters in solution, this base assimilates with the charcoal in the operation of the filter and promotes the action and increases the period of efficiency of the latter; hence the phosphate not only acts directly on the water, but also affects the operation of the charcoal.

What I claim as my invention is as follows:

1. A filtering composition in which are combined phosphate of lime and animal charcoal, substantially as and for the purposes specified.

2. A filtering composition consisting of gravel, white bar-sand, animal charcoal, and phosphate of lime, in or about the proportions specified.

RICHARD M. SOMMERS.

Witnesses:
JAS. L. STEVENSON,
B. A. MITCHELL.